United States Patent Office 2,838,409
Patented June 10, 1958

2,838,409

SILICA REFRACTORY

Ben Davies, Pittsburgh, and Donald O. McCreight, Library, Pa., assignors to Harbison-Walker Refractories Company, Pittsburgh, Pa., a corporation of Pennsylvania No Drawing. Application July 23, 1956
Serial No. 599,362

10 Claims. (Cl. 106—69)

This invention relates to silica refractories, especially shaped refractories such, for example, as brick.

Silica brick are products which have very high refractoriness and which are used for the construction of industrial furnaces of many types, particularly in the metallurgical industry and related fields. Wide use of silica refractories is attributed to their high melting point and their rigidity and strength at high temperatures. They find particular use in the construction of open hearth steel furnaces, particularly for roofs, and as the lining for by-product coke ovens. In such furnaces the eventual destruction of the silica refractory is brought about by a variety of forces that include the high temperatures encountered, corrosion by slags, and erosion by solid particles of dust or charge materials.

In the narrow vertical coking chambers of by-product coke ovens erosion is a particular problem, for at the end of the coking period a mechanical pusher forces the hot abrasive coke out of the oven by moving it through the entire length of the chamber. Under these conditions even the slightest surface defect in the silica refractory may contribute to the erosion problem, and in any case causes a defacement of an otherwise perfect surface which is sought by furnace builders. Consequently, standard practice now involves the rejection of all silica brick to be used in a coke oven that would provide an oven face with the small type of pit or hole that is caused by sizable grains of iron-containing impurities, for it is believed by furnace builders that erosion may have its inception at such pits or holes. Such rejection is expensive and is recognized as an industry-wide problem.

It is an object of the present invention to provide a method of preparing silica refractories that is simple and inexpensive; that does not require loss of raw materials; and that results in silica refractory shapes that are not subject to erosion due to sizable concentrations of iron or iron-containing materials.

Silica shapes such as brick are made from relatively pure silica, usually analyzing over 97 percent $SiO_2$. Suitable materials used in production of such silica shapes include quartzite, ganister, hard quartz pebbles, and sometimes it has been found possible to include a proportion of sand in the mix. In typical practice, the rock or silica material is crushed to provide a suitable proportion of coarse and fine grain sizes. The crushed rock may range in size from that which will just pass a 4 to 6 mesh screen down to an impalpable fineness, and it is graded and combined to give a formed shape with sound edges and corners. The sized materials are mixed or tempered with one or more bonding agents and water in a mixing pan and then formed into the desired shape. The shaped articles are then dried, for example at 200° F., and fired to temperatures generally exceeding about 2600° F. Drying hardens the bond so that the shapes will have sufficient strength to support those set above them in the kiln. Firing develops a permanent bond which sustains the brick during handling and subsequent industrial use.

The silica materials usually contain iron compounds as impurities in an amount of about 0.2 to 2 or 3 weight percent, based on the total composition, and hence the resultant shape contains that amount of iron oxide in addition to other iron introduced during the grinding operation, as by being ground from the machinery used, unless it is removed prior to forming and firing the shape. Iron produces a coloration of the refractory, and where the iron is fairly concentrated, a large iron spot results that is a point of possible erosion. The resultant spot normally is larger than the particle producing it for the iron diffuses during the firing of the refractory.

To avoid the surface defacement produced by iron spots, the obvious solution is the removal of the irony impurities. Metallic iron is highly magnetic and is easily removed from the mixture by simple magnetic means, as by running the ground silica material over a magnetic pulley at the end of a section of conveyor belting. However, the irony impurities in the silica rock are so very weakly magnetic that they are not removed by such means. It has been found that even after magnetic separation has been practiced the resulting silica brick may still be badly iron-spotted. The further beneficiation of the crushed material, such as by heavy media separation and electrostatic separation, has been considered a possibility to effect the separation, but much of the iron content that originates in the silica is intimately bound up therein and the rejection of all the iron would entail a rejection of a large portion of the silica itself, for example, as much as 20 to 30 percent. Economically such rejection would not be tolerable to free the silica of the small amount of irony materials that are present.

We have found that silica refractories of improved resistance to erosion can be produced by a procedure that results in a distribution of the iron content of the refractory throughout the mass. Consequently, large concentrations of iron, and resultant large spots on the fired refractory, are not permitted to form and the refractories produced do not have the erosion characteristics presently associated with iron-pitted silica refractories. This advantage is obtained without the necessity for rejecting any part of the silica materials normally employed in a silica refractory mix.

In accordance with our invention, silica rock is ground in the conventional manner to the usual range of sizes. The crushed rock is then treated by suitable beneficiation steps to separate selectively the larger particles that contain significant quantities of iron compounds. The separated material, which in normal beneficiation practice would have been considered tailings or waste, is then rendered usable by grinding it to fine particle size, for example, by putting it through a ball mill adapted to give a product of which substantially all will pass a 20-mesh screen. The finely ground iron-containing materials may then be recombined with the iron-free crushed silica rock, and the resultant mixture be blended with one or more bonding agents, tempered, pressed to desired form, and then fired. The resultant shapes, while containing all of the raw materials heretofore included in their preparation, are devoid of the large spots indicative of irony concentrations in silica refractories produced by conventional practice.

The temporary separation or beneficiation of the high iron concentrates from the silica mixture that is effected in practicing the present invention may be accomplished by any method known to those arts. If the iron concentrates are not spongy and if they have a bulk density sufficiently different from that of the silica rock, heavy media separation may be used. By way of example, a bulk density of 3.5 might be typical of irony impurities rich in limonite (hydrate of iron oxide), while 2.60 would be typical of quartz-bearing rock. By common methods of heavy media separation, for example, by suspending finely ground ferro-silicon in water, a suspension with an effective density of 3.0 may be maintained. In such a suspension the heavier iron-rich materials will be caused to sink while the lighter iron-free silica will float, thereby effecting an easy separation. The thus separated iron materials may then be ground, while wet if desired, in a ball mill or rod mill and be utilized in the ultimate refractory mix as above described. Other gravity separation methods may also be used in practicing the invention with the adaptability of any particular method being determined primarily by the characteristics of the silica rock being used.

Where heavy media separation and other gravity separation methods are not entirely satisfactory and where the iron is in a weakly magnetic form, for example, as limonite, hematite or siderite, a particularly satisfactory separation may be brought about by electrostatic separation. The separation may be aided by first drying the silica materials and by first removing all fines, whether or not they contain iron, for the fines are already of a size that do not contribute spots that can give rise to the erosion of resultant refractories. This removal of fines during beneficiation or preliminary to it, is not an essential step, but may increase the efficiency of the operation.

In a typical procedure of practicing the present invention, a washed high purity silica material such as quartzite is crushed to about one inch maximum diameter. After drying the crushed rock, it is ground in a dry pan, which is a slotted bottom type of grinder with heavy revolving muller wheels. Typically, the plates which make up the pan bottom and through which the silica material is ground would have slots ⅛" to ⅜" wide. The ground material is then screened through a 6 mesh screen with the over-sized particles being returned to the dry pan. The screened material is then passed through an electrostatic separator that is operated to reject substantially all of the iron-rich particles. These iron-containing particles are put through a ball mill and reduced to a size that passes 65 mesh, whereupon they are recombined with the iron-free silica in a mixer. The usual hydrated lime, in an amount equivalent to 2 to 6 percent CaO in the resultant mix, with or without other bonding agents (such as concentrated lignin liquor), and sufficient water to temper the resultant mixture are blended with the refractory silica materials in the mixer. The tempered batch is then fed to a forming machine where the desired shapes are pressed, after which the shapes are dried and then fired in a kiln.

Silica refractories produced by the method just described do not have the spots characteristic of iron concentrates. Instead the fine irony particles that result upon ball milling or grinding are thoroughly distributed throughout the mix of refractory and, upon firing, the the iron diffuses thereby imparting a desirable diffused coloring to the refractories produced.

The screen analysis of a silica batch for making silica brick of the desired high density would commonly be as follows:

| | | |
|---|---|---|
| Pass 4 on 6 mesh | Trace | |
| Pass 6 on 8 mesh | 3 | 13% |
| Pass 8 on 10 mesh | 10 | |
| Pass 10 on 14 mesh | 12 | |
| Pass 14 on 20 mesh | 8 | 27% |
| Pass 20 on 28 mesh | 7 | |
| Pass 28 on 35 mesh | 6 | |
| Pass 35 on 48 mesh | 5 | 15% |
| Pass 48 on 65 mesh | 4 | |
| Pass 65 mesh | | 45% |

In the example described above, the product of the dry pan followed by the 6 mesh screen is a distribution of grain sizes similar to the tabularized analysis, except that there will ordinarily be a deficiency of the finest sizes, such as those passing 65 mesh. To make up this deficiency it is good practice to grind about a third of the 6 mesh dry pan product to ball mill sizings. In the present invention that step may be unnecessary for the high-iron tailings may be mall milled, thereby effectively reducing the irony materials to a size that does not result in high iron concentrations in the resultant brick and simultaneously providing the desired percentage of fines that are required in producing a high density brick. Where the quantity of irony materials separated for subsequent grinding is insufficient to provide the desired quantity of fines, we may simply supplement the ball mill charge with some of the larger iron-free silica, or even a portion of the untreated dry pan product.

We have referred variously to the surface defacing material as iron-bearing, as iron-rich, and as high iron materials, and wish it to be known that we have reference to such materials that cause bad spotting or pitting of the finished refractory regardless of the form of the iron or iron-bearing substances. Other impurities which similarly deface the product, such as manganese-bearing grains, and which may be rendered impotent to cause such spots by our process, are to be considered within the scope of our invention.

According to the provisions of the patent statutes, we have explained the principle of our invention and have described what we now believe to be the best embodiment. However, we desire to have it understood that, within the scope of the appended claims, the invention may be practiced otherwise than as specifically described.

We claim:

1. In the method of preparing silica refractory shapes wherein iron-compound containing silica rock is crushed and then combined in a range of sizes that will result in a sound refractory, a bonding agent is mixed with the sized rock, the resultant mixture is tempered, and the refractory shapes formed of the tempered batch are dried and fired, the improvement comprising separating from the crushed rock the coarser particles thereof having a substantial iron content, crushing the separated iron-containing particles to a smaller average particle size, and then adding the crushed iron-containing particles to the crushed silica rock, whereby iron-containing silica shapes that are devoid of concentrations of iron are produced.

2. A method according to claim 1, the iron-containing particles being separated from the crushed silica rock by gravity.

3. A method according to claim 1, the iron-containing particles being electrostatically separated from the crushed silica rock.

4. A method according to claim 1, the separated iron-containing particles being ground sufficiently to pass a 20 mesh screen.

5. A method according to claim 1, the separated iron-containing particles being ground sufficiently to pass a 65 mesh screen.

6. In the method of preparing silica refractory shapes wherein iron-compound containing silica rock is crushed and then combined in a range of sizes that will result in a sound refractory, a bonding agent is mixed with the sized rock, the resultant mixture is tempered, and the refractory shapes formed of the tempered batch are dried and fired, the improvement comprising separating fines from the crushed rock particles, then separating the iron-containing particles from the crushed rock that is free of fines, crushing the separated iron-containing particles to a smaller average particle size, and then combining the fines, the crushed iron-containing particles, and the iron-free silica rock, whereby silica shapes that are devoid of concentrations of iron are produced.

7. A method according to claim 6, the iron-containing particles being electrostatically separated from the crushed silica rock.

8. A method according to claim 6, the iron-containing particles being separated from the crushed silica rock by gravity.

9. A method according to claim 6, the separated iron-containing particles being ground sufficiently to pass a 20 mesh screen.

10. A method according to claim 6, the separated iron-containing particles being ground sufficiently to pass a 65 mesh screen.

References Cited in the file of this patent
UNITED STATES PATENTS 2,352,324    Hubler _____ June 27, 1944